Patented Aug. 16, 1932

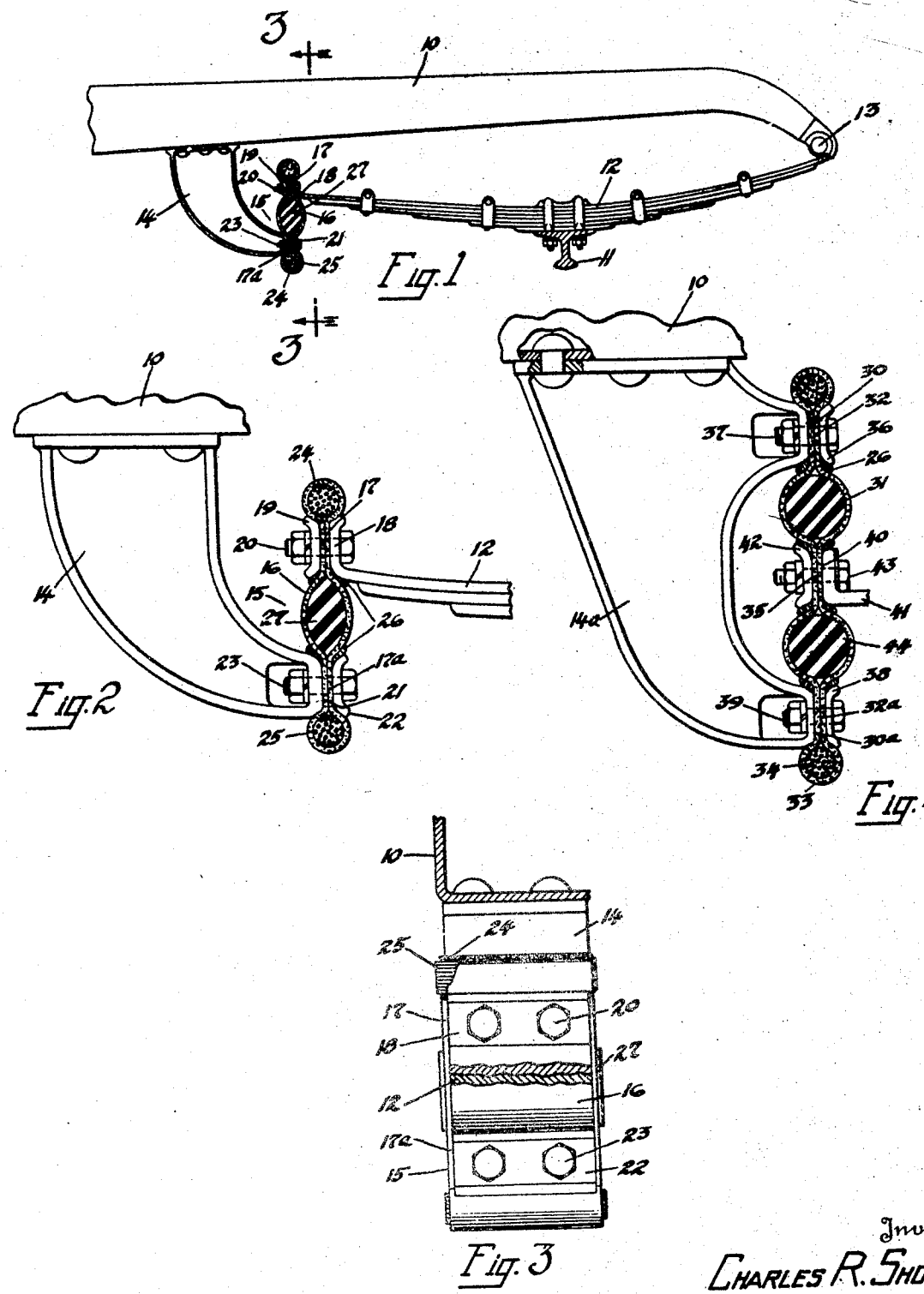

1,871,921

UNITED STATES PATENT OFFICE

CHARLES R. SHORT, OF DETROIT, MICHIGAN, ASSIGNOR TO THE INLAND MANUFACTURING COMPANY, OF DAYTON, OHIO, A CORPORATION OF DELAWARE

FLEXIBLE CONNECTER

Application filed January 14, 1926. Serial No. 81,19.

This invention relates to flexible connecters adapted for use as substitutes for spring shackles, torque arm connections and the like.

Its object is to avoid wear in flexible connecters adjacent the areas where they are clamped or otherwise secured to the parts to be connected; to render such connecters elastic, and to equalize the strains on the connecter whenever more force is applied at one edge than to another, or to certain of the strands than to others when the connecter comprises a plurality of strands.

The invention consists in the combinations and details of construction more fully described hereinafter and illustrated in the accompanying drawing.

In the drawing:

Fig. 1 is a side elevation illustrating a connecter made in accordance with this invention, functioning as a spring shackle in a vehicle chassis;

Fig. 2 is a side elevation showing a spring connecter, attached as in Fig. 1, on an enlarged scale;

Fig. 3 is an enlarged cross section on the line 3—3 of Fig. 1;

Fig. 4 is a view of a modified form of the invention which may function either as a spring or a torque arm connecter.

In Fig. 1, 10 indicates a side sill of an automobile frame; 11 a front axle; 12 a leaf spring, the middle portion of which is mounted on said axle 11; 13 the pivotal connection of the front end of said spring with the front end of the sill 10; 14 a bracket bolted to the sill 10 to which the connecter designated as a whole by the numeral 15 is attached adjacent one end, the other end being attached to the rear end of the spring.

In the illustrated embodiment the connecter 15 comprises flexible material preferably made of spun or laid cords or cord fabric formed into an endless band, as indicated in the drawing, with the cords or warp yarns substantially parallel and extending lengthwise of the connecter. The flexible material is designated 16 in Figs. 1, 2 and 3. The endless band may be folded so that two plies are in contact at least for portions of its length. As shown in Figs. 1, 2 and 3 the two plies are in contact at the portions designated 17 and 17a. The portion 17 as shown in Fig. 2 is clamped between the upturned end 18 of the long leaf of spring 12 and a clamping plate 19. Suitable clamping bolts 20 pass through perforations in the flange 18, plate 19 and portion 17 of the connecter for the purpose of clamping said portion 17 between the clamping surfaces of the flange 18 and plate 19. The portion 17a is similarly clamped between a surface 21 on the bracket 14 and a plate 22, by the bolts 23.

In order to remove some of the strain from the clamps and bolts, the looped ends 24 of the connecter are caused to extend above the upper clamp and below the lower clamp. Within the loops, plugs 25 are inserted. These plugs may be of any suitable material such as rubber, wood, vulcanite or non-corrosive metal. The enlarged portions formed by the plugs 25 inserted in the loops 24 insure the strength of the joint between the connecter and the clamps and obviate any frayed ends.

For the purpose of preventing chafing and cutting of the fabric by the edges of the clamping means, a filling of suitable elastic material is inserted as at 26, between the fabric of the connecter and the adjacent metallic parts which are flared. This anti-chafing filling may be made of pure elastic rubber and may be inserted so as to be under compression when the mid-plane of the connecter is straight from end to end. As the connecter sways and swings during use the fillings 26 will deform under pressure and recover their position when the pressure is released. By the use of these fillers, chafing is prevented between the metal and fabric and the entrance of grit and water rendered substantially impossible.

When the flexible material 16 is composed of spun or other fiber, the yarns, cords or fabric are preferably impregnated with rubber. Those portions at 17 and 17a which are held between the clamps are preferably cured hard and the other portions cured soft. Thus the parts that have to sustain the pressure of the clamps are made relatively unyielding for purposes of security and resistance to moisture, but merge into soft and flexible portions which yield to the relative movements of the connected parts.

Although the material 16 is flexible, it is relatively unstretchable and inelastic. In order to render the connection elastic the flexible relatively unstretchable material surrounds an elastic deformable mass between the clamps, leaving a portion of the surface area of said mass unconfined so that the mass may deform in response to pressure applied by the flexible material under strains. In the form shown, the two plies of the flexible material are separated and deflected between the clamps by a mass 27 of elastic rubber or equivalent deformable elastic material. The ends of the mass 27 are unconfined and free to bulge endwise when the mass is deformed by tension applied to the flexible material. By this construction it will be apparent that if the spring 12, for example, is skewed with respect to the frame as might occur when the frame of the vehicle is tilted, so that more pull is applied to the strands at one edge of the connecter than to those at the other, yet the strains will be distributed to all of the strands by reason of the elastic deformation of the mass 27. The mass 27 is intended to be vulcanized or cured in place with the impregnated strands, fabric or flexible material 16. In the same manner the plugs 25 may be united, if desired, to the loops 24, which, it will be understood, are also impregnated preferably with a rubber compound.

The construction shown in Fig. 4, is particularly well adapted to be used where relative movement is intended to be resisted in two opposite directions. In this figure, 14a indicates a bracket having projecting portions each of which has a clamping surface 30 and 30a respectively. A flexible band preferably made of cords or cord fabric wound or woven into a continuous band similarly as described in connection with the material 16 is indicated by the numeral 31. This band is folded so as to bring the two plies together as at 32 and 32a, loops 33 being allowed to project above the portion 32 and below the portion 32a. The loops 33 are intended to be filled by a plug 34 as in the form previously described. Midway between the portions 32 and 32a the plies are similarly brought into contact as shown at 35. The portion 32 is clamped to the surface 30 by means of a clamping plate 36 and clamping bolts 37. Likewise the portion 32a is clamped to the surface 30a by means of a clamping plate 38 secured to the surface 30a by means of clamping bolts 39.

The part 35 is clamped to a clamping surface 40 on the end of a spring or torque arm 41 by means of a clamping plate 42 which is secured to the member 41 by bolts 43.

The portions 32, 32a and 35 are hard and unyielding so as to resist wear and compression and avoid the absorption of water.

The entire material or fabric 31 is impregnated with a rubber composition which is cured hard at the portions 32, 32a and 35, the hard portion merging into relatively soft and yielding portions between said hard portions. Masses of elastic rubber or equivalent elastic deformable material 44 are arranged between the plies of the material 31 and preferably vulcanized thereto. These masses of rubber are preferably circular in cross section and are unconfined at their ends. As a result of this cross section in whatever way the masses 44 are deformed, they will tend to tighten the connection between them and the fabric 31 and therefore avoid separating of the fabric and rubber mass under repeated flexing, tension and compression movements.

Fillings of soft rubber or like material 26 are applied between the flaring edges of the clamps and the fabric as in the form shown in Fig. 2.

By means of the construction shown, an elastic connecter may be produced in which the tension upon the various portions of the connecter will be equally distributed throughout, even though some portions be stretched more than others. Objection to the use of flexible connecters of this general type by reason of their tendency to fray and chafe because of grit filling the spaces between the fabric portions and metal portions is obviated. The strains are not resisted by a mere clamp or bolted connection. The form is such that the strains to which the connecter is subjected tend to more firmly unite the rubber or elastic material with the fabric envelope so that there is no tendency for the rubber and fabric to separate.

Although the drawing shows and the specification describes a particular embodiment which is the best form of the invention now known to me, it is to be understood that it is not intended that the invention shall be limited to the specific construction illustrated and described, but only by the appending claims.

What I claim and desire to secure by Letters Patent of the United States is as follows:

1. In means for flexibly connecting two members, a connecter comprising flexible fibrous material, clamping means engaging a portion of the material for securing the connecter to at least one of the members to be connected, and elastic filling interposed between the edges of the clamping means and the adjacent surfaces of the connecter.

2. A flexible connecter for connecting two spaced relatively movable parts, comprising: a flexible molded unit having two substantially non-stretchable rubberized fabric webs having mutually contacting spaced portions thereof clamped to said spaced movable parts respectively, said molded unit having an intermediate portion comprising a cylindrical block of elastic rubber interposed between and vulcanized to said rubberized fabric webs, said elastic block having unconfined end areas, whereby any deformation of said molded unit causes the fabric to bind more tightly upon said cylindrical rubber block.

In testimony whereof I affix my signature.

CHARLES R. SHORT.